(12) United States Patent
Sherlock

(10) Patent No.: US 11,096,012 B2
(45) Date of Patent: Aug. 17, 2021

(54) INTEGRATED WI-FI LOCATION

(71) Applicant: TEXAS INSTRUMENTS INCORPORATED, Dallas, TX (US)

(72) Inventor: Ian James Sherlock, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/425,839

(22) Filed: May 29, 2019

(65) Prior Publication Data
US 2020/0382907 A1 Dec. 3, 2020

(51) Int. Cl.
*H04W 24/00* (2009.01)
*H04W 4/029* (2018.01)
*G06F 1/28* (2006.01)
*G06F 9/54* (2006.01)
*G06F 9/4401* (2018.01)
*H04W 84/12* (2009.01)

(52) U.S. Cl.
CPC ............. *H04W 4/029* (2018.02); *G06F 1/28* (2013.01); *G06F 9/4418* (2013.01); *G06F 9/547* (2013.01); *H04W 84/12* (2013.01)

(58) Field of Classification Search
CPC ..... H04W 4/029; H04W 84/12; H04W 84/18; H04W 4/80; H04W 4/90; H04M 2250/02; H04M 1/7253; H04M 1/00; G06F 1/28; G06F 9/4418; G06F 9/547; G06F 1/1626; G06F 1/1684; G06F 1/1698; H04Q 5/22; G06Q 10/08; G06Q 10/087; G06Q 10/10; G06Q 50/26; H04L 29/2009; H04L 29/12839; A61B 5/002

USPC ................ 455/456.1, 550.1, 556.1; 340/10.1
See application file for complete search history.

(56) References Cited

U.S. PATENT DOCUMENTS

| | | | | |
|---|---|---|---|---|
| 6,058,434 | A * | 5/2000 | Wilt ........................ | G06F 13/00 709/217 |
| 6,363,417 | B1 * | 3/2002 | Howard .................... | G06F 9/54 709/203 |
| 6,745,047 | B1 * | 6/2004 | Karstens ............... | G06F 1/1632 455/556.1 |
| 10,037,300 | B2 * | 7/2018 | Goldberger ............. | G01S 19/19 |
| 10,418,813 | B1 * | 9/2019 | King ................... | H02J 13/0017 |
| 2004/0064519 | A1 * | 4/2004 | Kato .................... | G06F 11/0757 709/208 |
| 2004/0125744 | A1 * | 7/2004 | Perrot ............... | H04L 29/12009 370/212 |

(Continued)

FOREIGN PATENT DOCUMENTS

CN 106095043 A * 11/2016
CN 205827616 U * 12/2016

*Primary Examiner* — Mahendra R Patel
(74) *Attorney, Agent, or Firm* — Charles F. Koch; Charles A. Brill; Frank D. Cimino

(57) ABSTRACT

An apparatus includes an integrated circuit that includes a microprocessor and a microcontroller unit circuit (MCU) coupled to the microprocessor. The MCU includes a central processing unit (CPU) core and a network processor that implements a wireless interface. The MCU is configured to execute a location application that facilitates a determination of a physical location of the apparatus. The MCU may also be configured to support one or more management functions. The microprocessor sends data to the MCU for wireless transmission by the MCU's wireless interface.

20 Claims, 1 Drawing Sheet

(56) References Cited

U.S. PATENT DOCUMENTS

| | | | |
|---|---|---|---|
| 2006/0190656 A1* | 8/2006 | Davies | G06T 1/60 |
| | | | 710/306 |
| 2006/0267731 A1* | 11/2006 | Chen | G06Q 10/08 |
| | | | 340/10.1 |
| 2007/0108945 A1* | 5/2007 | Ohashi | H02J 7/0071 |
| | | | 320/130 |
| 2008/0018427 A1* | 1/2008 | Ezra | H04L 1/22 |
| | | | 340/7.32 |
| 2008/0074084 A1* | 3/2008 | Lee | H02J 7/0029 |
| | | | 320/150 |
| 2008/0146265 A1* | 6/2008 | Valavi | A61B 5/002 |
| | | | 455/550.1 |
| 2009/0002901 A1* | 1/2009 | Matsumoto | H03K 17/08122 |
| | | | 361/18 |
| 2009/0127932 A1* | 5/2009 | Warren | H02J 9/06 |
| | | | 307/64 |
| 2012/0011365 A1* | 1/2012 | Schmidt | H04W 28/06 |
| | | | 713/168 |
| 2012/0295636 A1* | 11/2012 | Drucker | H04W 4/02 |
| | | | 455/456.1 |
| 2013/0140899 A1* | 6/2013 | Tuukkanen | H02J 9/00 |
| | | | 307/66 |
| 2013/0343198 A1* | 12/2013 | Chhabra | H04W 48/12 |
| | | | 370/242 |
| 2015/0248833 A1* | 9/2015 | Arne | G08C 17/02 |
| | | | 340/870.07 |
| 2015/0286835 A1* | 10/2015 | Azoulai | H04W 4/80 |
| | | | 713/193 |
| 2018/0278088 A1* | 9/2018 | Toyoda | H02J 9/06 |

* cited by examiner

INTEGRATED WI-FI LOCATION

BACKGROUND

Many portable electronic devices used, for example, in enterprise settings incorporate Wi-Fi for data communication. Examples of such portable devices include logic analyzers used in corporate labs and patient bedside monitors used in hospitals. These products typically execute an embedded high-level operating system such as Linux and are plugged into the building electrical power system. When the equipment is powered, data may be captured, displayed locally and transmitted via an internal Wi-Fi interface to a remote device (e.g., a centralized server or database). When the equipment is not powered, the Wi-Fi connection is lost. When not needed, portable equipment often is unplugged from a power outlet (e.g., wall outlet, power strip).

The enterprise may desire to track the location of the equipment, even when the equipment is powered off. Accordingly, some enterprises use self-contained battery-powered radio location tags for equipment tracking purposes. Various radio frequency (RF) protocols can be used for tracking purposes including Bluetooth, sub-1 GHz and Wi-Fi. When Wi-Fi is used for location, a Wi-Fi tag is adhered to the exterior of equipment to be tracked and can exchange wireless signals with a Wi-Fi access point for location determination purposes.

SUMMARY

In one example, an apparatus includes an integrated circuit that includes a microprocessor and a microcontroller unit circuit (MCU) coupled to the microprocessor. The MCU includes a central processing unit (CPU) core and a network processor that implements a wireless interface. The MCU is configured to execute a location application that facilitates a determination of a physical location of the apparatus. The microprocessor sends data to the MCU for wireless transmission by the MCU's wireless interface.

BRIEF DESCRIPTION OF THE DRAWINGS

For a detailed description of various examples, reference will now be made to the accompanying drawings in which.

DETAILED DESCRIPTION

Figure 1:
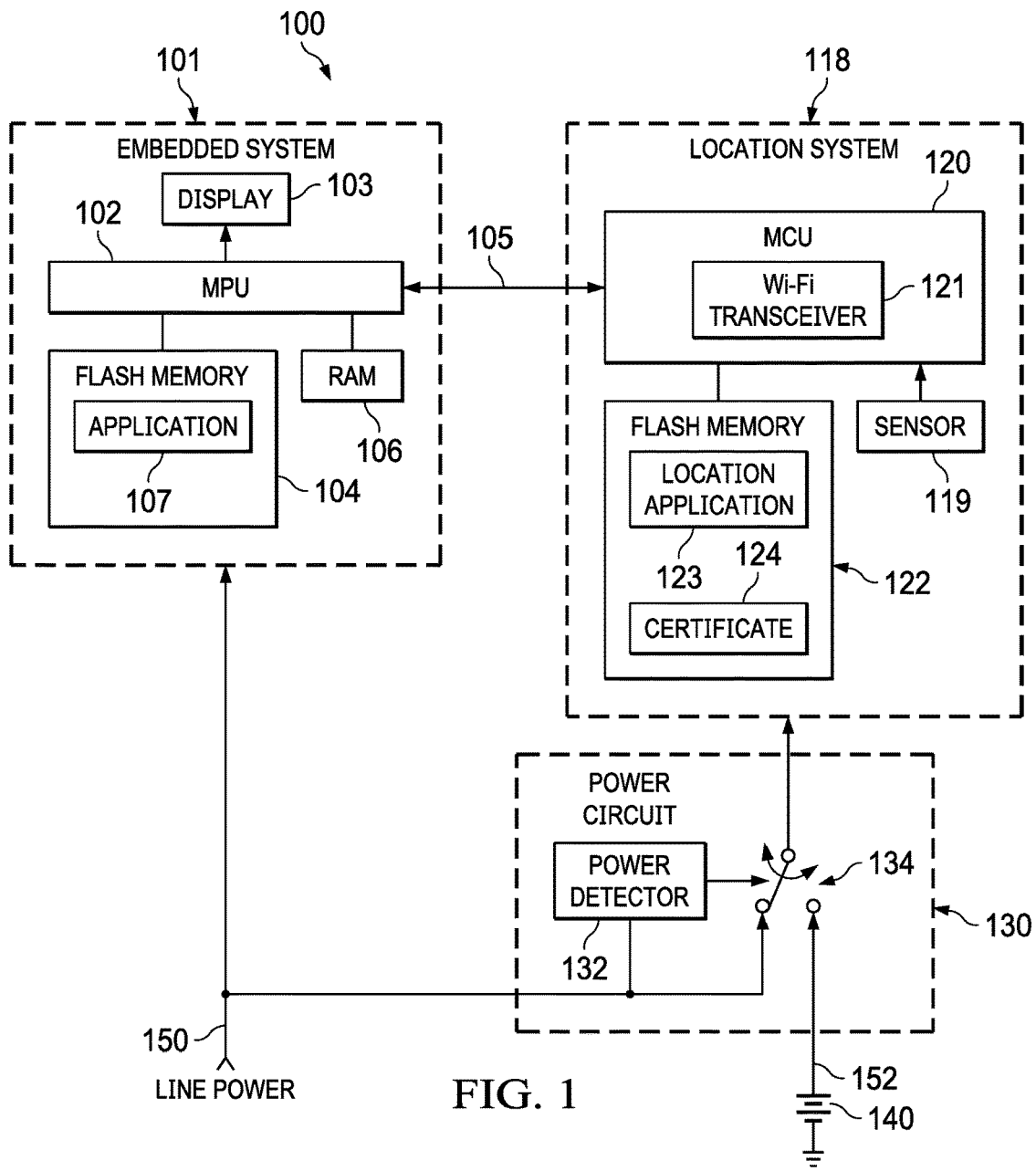
FIG. 1 illustrates a hardware diagram of a system in accordance with the described examples.

The equipment described above typically includes an embedded host system and a Wi-Fi interface. The embedded host system includes a processor, memory, and a Wi-Fi transceiver. The Wi-Fi tag is a self-contained battery powered device that is physically attached to the equipment after purchase. The Wi-Fi tag includes its own Wi-Fi transceiver coupled to a network processor and a microprocessor. The Wi-Fi tag is battery-powered and the embedded host system is line-powered. When line-powered, the embedded host system executes an application (e.g., logic analyzer application, patient bedside monitor application, etc.). The embedded host system uses its own Wi-Fi transceiver to send and receive data wirelessly when executing the embedded application. Often, such transmissions are secured through the use of protocols such as Transport Layer Security (TLS) that rely on security certificates. In one example, a security certificate is generated by a Certificate Authority (CA) and used to digitally sign and verify a communication to/from the embedded host system. Such security certificates often have a defined lifetime, at the end of which the certificate is no longer valid and must be re-generated by the CA and stored in non-volatile memory in the embedded system.

As explained above, the Wi-Fi tag has its own Wi-Fi transceiver, network processor, and microcontroller that executes a location application usable to assist the network in which the equipment operates to determine an approximate physical location of the equipment (e.g., room-level accuracy). As the Wi-Fi tag is battery-operated, the network can determine the physical location of the equipment whether or not the equipment's embedded system is line-powered and operational. However, because the Wi-Fi tag typically is an after-market, external addition to the equipment that includes a second Wi-Fi interface, it adds considerable cost in terms of added equipment and technician installation time. The equipment is line powered, and when line power is not available the equipment cannot connect to the network and cannot be managed remotely. For example, a new security certificate cannot be wirelessly transmitted to and stored in the embedded system. Instead, the equipment would need to be located via the battery-powered Wi-Fi tag, physically brought to a maintenance area, and turned on via line power so that its security certificate can be replaced.

The innovative system described below includes a power-efficient Wi-Fi transceiver that is shared by both the embedded system's line-powered processor, as well as the location system's microcontroller unit (MCU). Thus, two separate Wi-Fi transceivers are not necessary for location and embedded application purposes. Further, the power architecture for the system described below is different than for the conventional system described above. In the conventional system described above, the Wi-Fi tag receives its power only from its battery, while the embedded system receives line power (when available). The system described below, however, includes a power circuit that provides line power (when available) to both the embedded system and the location system. When line power is not available, the power circuit operationally couples a battery to the power efficient location system, but not the embedded system. Accordingly, power is continually provided to the location system and location determinations can be made whether or not the equipment receives line power and the embedded system is powered on.

The location system also includes a flash memory device, which thus is operable from line power or battery power. The flash memory device of the location system can be used to receive and store security certificates used by the location system or by the embedded system. Because the location system operates from battery power when line power is unavailable and the location system includes both the Wi-Fi transceiver as well as the flash memory device, new security certificates can be wirelessly received by the location system even when line power is unavailable, thereby avoiding the manual effort of locating the equipment, physically moving it to a maintenance area, and turning it on to be able provide it with a new security certificate.

FIG. 1 shows an example of an apparatus 100 that includes an embedded system 101, a location system 118, a power circuit 130, and a battery 140. Additional components can be included as desired. The embedded system 101 includes a microprocessor unit (MPU) 102 (also termed a "processor"), a display 103, flash memory 104, and random-access memory (RAM) 106. The location system 118 includes a microcontroller unit (MCU) 120 (also termed a "processor"), flash memory 122, and a sensor 119 (e.g., a motion sensor, a temperature sensor, etc.). The flash memories 104 and 122 comprise re-programmable, non-transitory storage devices and can be used to store, for example, executable code, security certificates, and other information.

The MPU 102 of the embedded system 101 executes an application 107 stored in flash memory 104. The application 107 may be executed directly from flash memory 104, or may be copied to RAM 106 for execution therefrom. When executed, the application 107 causes the MPU 102 to implement one or more functions for apparatus 100. For example, the application 107 can cause the MPU 102 to acquire data, display data on display 103, and transmit data wirelessly to a device remote from the apparatus 100. The application 107 may cause the MPU 102 in the apparatus 100 to function as a logic analyzer, patient bedside monitor, or other type of equipment.

The flash memory 122 of the location system 118 stores a location application 123, which is executable by the MCU 120. The flash memory 122 also can be used to store one or more security certificates 124 usable for authenticating the apparatus 100 to a remote device receiving packets from the apparatus. A first certificate can be used by the location system's MCU 120 during transmissions with an access point to determine the location of apparatus 100. A second certificate can be used by the MPU 102 when executing application 107 (e.g., to transmit logic analyzer or patient data to a network) and sending/receiving packets to/from a network.

The location system 118 determines, or at least facilitates the determination of, the location of the apparatus 100. In one example, the location system 118 records an identifier of an Wi-Fi access point to which the Wi-Fi transceiver 121 is associated. When prompted for the access point identifier from a remote device, the Wi-Fi transceiver responds with the requested identifier. The physical locations of the access points are known apriori and thus, within the communication range of the access points, the location of the apparatus 100 can be determined. In one implementation, room-level accuracy is possible. In another example, the location system 118 calculates the time of flight of Wi-Fi data frames to any one or more of multiple access points so that the resulting timing information can be used to calculate the location of the equipment containing location system 118. In another example, the sensor 119 connected to MCU 120 can be used to trigger waking the MCU (from a lower power mode of operation) and/or transmission of a notification (e.g., Wi-Fi data frame) to a local access point to send an alert that the equipment has been moved. Once woken, the MCU 120 (or network processor) can receive management requests to, for example, change security parameters such as a digital certificate, an encryption key, etc. In some implementations, an access point can send a data frame to the MCU 120 without having a sensor triggering a wake-up event.

The power circuit 130 includes a power detector circuit 132 and a power switch 134. The power switch 134 may comprise a transistor such as one or more metal oxide semiconductor field effect transistors (MOSFETs). The power detector circuit 132 of the power circuit 130 is coupled to a line voltage source node 150, which itself can be connected to an alternating current (AC) voltage supply such as via a wall outlet or power strip. The power circuit 130 also couples to a battery node 152 of battery 140. When line power is available on voltage source node 150, line power is provided to the embedded system 101 and through power switch 134 to the location system 118. The power detector 132 detects whether the voltage level on the line voltage source node 150 is above a threshold voltage level. The voltage on node 150 being above the threshold indicates that line voltage is available and provided to the apparatus 100. Accordingly, the power detector circuit 132 configures the power switch 134 into the state as shown in FIG. 1 to allow line voltage to be provided through the power switch 134 to the location system 118. If the power detector circuit 132 does not detect a line voltage in excess of the threshold, then the power detector circuit 132 configures the power switch 134 to the opposite state to electrically couple battery 140 to the location system 118. In this latter state, the location system 118 operates from battery power, and the embedded system is non-operational. In another example, battery 140 is rechargeable and is charged when line power is available.

The MCU 120 in this example includes a Wi-Fi transceiver 121. The MCU 120 is electrically coupled to the MPU 102 of the embedded system 101 via communication link 105. The communication link 105 may be serial or parallel and the data frame encapsulation may be chosen for convenient implementation based on the operating system and network stacks used in the apparatus 100. When the apparatus 100 is connected to a source of line power and the embedded system 101 is turned on, the MPU 102 can transmit data to the MCU 120 over link 105, for the MCU 120 to have wirelessly transmitted via its Wi-Fi transceiver 121 to a remote device. Accordingly, the embedded system 101 need not include (but could include) its own Wi-Fi transceiver. If a security certificate is to be used for the transmission of data originated by the MPU 102, a certificate 124 from flash memory 122 can be used. Alternatively, a certificate provided wirelessly to the location system's flash memory 122 can be transmitted via the MCU 120 to the MPU 102 and stored in the embedded system's flash memory 104, and used therefrom for security authentication and other purposes.

In one implementation, the MCU 120 of the location system 118 is fabricated as an integrated circuit (IC) on a semiconductor die, and the MPU 102 of the embedded system 101 is fabricated as an IC on a separate semiconductor die. The flash memory 122 may be fabricated on the same die as the MCU 120, or the flash memory 122 may be fabricated on a separate die from the die containing MCU 120. Similarly, the flash memory 104 and RAM 106 may be fabricated on the same die as the MPU 102, or the flash memory 104 and RAM 106 may be fabricated on a separate die from the die containing the MPU 102. In another implementation, a single semiconductor die can include the MPU 102 and the MCU 120.

Figure 2:
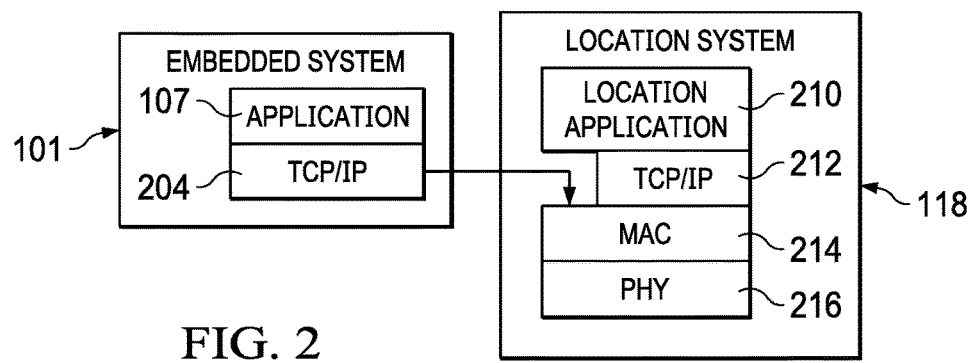
FIG. 2 illustrates a software architecture implemented on the system of FIG. 1.

FIG. 2 depicts an example of a software architecture implemented on apparatus 100. The software in the embedded system 101 includes an application 107 and a Transmission Control Protocol/Internet Protocol (TCP/IP) stack 204, both of which are stored on flash memory 104 and executed by the MPU 102. The application 202 causes the MPU 102 to provide the functionality of the embedded system (e.g., logic analyzer, bedside monitor, etc.).

The software in the location system 118 includes a location application 210, a TCP/IP stack 212, and a Media Access Control (MAC) data link layer 214, all of which are stored on flash memory 122 and are executed by the MCU 120. The location application 210 causes the MCU 120 to assist in the determination of the location of the apparatus 100. Determining the location of the apparatus also of course means determining the location of any of the components of the apparatus such as the flash memory 122 within the location system 118.

A physical (PHY) layer 216 includes the Wi-Fi transceiver and wirelessly sends and receives packets. Data generated by location application 210 and to be sent as packets to a remote device for location assessment purposes may be encapsulated with headers in accordance with the TCP/IP protocols and provided through the MAC data link layer 214 to the PHY 216 for transmission therefrom. Packets received by the PHY 216 and targeting the location application 210 progress in the opposite direction through, for example, the MAC data link layer 214 and the TCP/IP stack 212.

Data generated by the application 107 of the embedded system 101 is encapsulate with TCP/IP headers by the TCP/IP stack 204 executing on the embedded system's MPU 102. An Application Programming Interface (API) is exposed to the MAC data link layer 214 to permit a packet from the embedded system's TCP/IP stack 204 to be processed by the location system's MAC data link layer 214. As an example, TCP/IP stack 204 sends and receives frames to and from MAC 214 using IEEE 802.3 ethernet format encapsulation.

The hardware architecture of FIG. 1 and the software architecture of FIG. 2 provide several benefits relative to the use of Wi-Fi tags that are not operably connected to the embedded system, and which means the embedded system and the Wi-Fi tag have separate Wi-Fi transceivers. First, the disclosed examples of FIGS. 1 and 2 include a Wi-Fi transceiver 121 that is shared by both the MCU 120 of the location system 118 and the MPU 102 of the embedded system 101. Thus, only one Wi-Fi transceiver need be present (although more than one can be included as desired). Fewer hardware components generally results in a more reliable and less costly system. Second, the software executing on the location system's MCU 120 includes a MAC data link layer 214 that is used by the software executing on the embedded system's MPU 102. Accordingly, the embedded system 101 need not include its own MAC data link layer, thereby simplifying the software design for apparatus 100. Third, because the location system 118 is continuously operational (either line-powered or battery-powered), maintenance operations can be performed wirelessly on the apparatus 100 without locating and physically moving the apparatus to a maintenance area. The location system 118 includes a Wi-Fi transceiver 121 and flash memory 122 which permits, for example, a new security certificate to be wirelessly transmitted to the location system for storage in the flash memory 122 and subsequent use by the embedded system 101 after the embedded system is powered on via line power. Alarms can be triggered through wireless access to the location system 118. For example, if the equipment is determined to be located in an improper location, a wireless message could be sent to the location system 118 to trigger an alarm (e.g., siren, flashing light, voice alert, etc.).

In this description, the term "couple" or "couples" means either an indirect or direct wired or wireless connection. Thus, if a first device couples to a second device, that connection may be through a direct connection or through an indirect connection via other devices and connections. Modifications are possible in the described embodiments, and other embodiments are possible, within the scope of the claims.

What is claimed is:

1. An apparatus comprising:
   an integrated circuit that includes:
      a microprocessor; and
      a microcontroller unit circuit (MCU) coupled to the microprocessor, the MCU is coupled to or includes a network processor that implements a wireless interface, and the MCU is configured to execute a location application that facilitates a determination of a physical location of the apparatus;
      wherein the microprocessor is configured to send application data to the MCU for wireless transmission by the MCU's wireless interface; and
   a battery and a power circuit, the power circuit is coupled to a line power source and a battery power source, the power circuit including a power detector circuit and a power switch, wherein:
      responsive to the power detector circuit detecting a presence of line power, the power switch is configured to provide the line power to the microprocessor and to the MCU; and
      responsive to the power detector circuit not detecting the presence of the line power, the power switch is configured to prevent the microprocessor from receiving the line power and is configured to provide battery power to the MCU.

2. The apparatus of claim 1, further comprising a sensor coupled to the MCU, the sensor configurable to wake the MCU upon detection of an event to trigger an alarm.

3. The apparatus of claim 2, wherein the sensor comprises at least one of a motion sensor and a temperature sensor.

4. The apparatus of claim 2, wherein, in response to a signal from the sensor, the MCU is configured to transmit a wireless notification of the event.

5. The apparatus of claim 1, wherein the MCU or the network processor is configured to receive a wireless wake request, and after being woken, to receive a management request.

6. The apparatus of claim 1, wherein the battery is rechargeable.

7. The apparatus of claim 1, wherein:
   the microprocessor is to execute a first software stack, the first software stack including a first transmission control protocol/internet protocol (TCP/IP) layer;
   the MCU or the network processor is to execute a second software stack, the second software stack including a second TCP/IP layer and a media access control (MAC) layer;
   wherein the first TCP/IP layer and the second TCP/IP layer are to access the MAC layer using separate application programming interfaces (APIs).

8. The apparatus of claim 1, wherein:
   the microprocessor is to execute a first software stack, the first software stack including a first transmission control protocol/internet protocol (TCP/IP) layer;
   the MCU or the network processor is to execute a second software stack, the second software stack including a second TCP/IP layer;
   wherein the first TCP/IP layer and the second TCP/IP layer are to access a media access control (MAC) using separate application programming interfaces (APIs).

9. The apparatus of claim 1, wherein the microprocessor executes a Linux operating system.

10. A method, comprising:
  determining, by a microcontroller unit circuit (MCU), location information to facilitate determination of a location of equipment containing the MCU;
  responsive to detecting a presence of line power from a line power source:
    causing a power switch to provide the line power to the microcontroller and the MCU;
    transmitting application data, from a microprocessor to the MCU; and
    causing, by the MCU, the application data and the location information to be wirelessly transmitted to a receiver; and
  responsive to not detecting the presence of line power from the line power source, causing the power switch to provide battery power to the MCU.

11. The method of claim 10, further comprising receiving, by the MCU, a signal from a sensor to wake the MCU.

12. The method of claim 11, wherein the sensor comprises at least one of a motion sensor and a temperature sensor.

13. The method of claim 11, wherein, in response to the signal from the sensor, the method comprises transmitting, by the MCU, a wireless notification of an event.

14. The method of claim 11, further comprising:
  receiving, by the MCU, a wireless wake request; and
  receiving, by the MCU, a management request comprising a security parameter.

15. The apparatus of claim 5, wherein:
  the MCU is coupled to or includes a memory configured to store the management request.

16. The apparatus of claim 15, wherein:
  the memory is a flash memory.

17. The apparatus of claim 5, wherein:
  the management request includes a security parameter associated with the wireless transmission by the MCU's wireless interface of the application data from the microprocessor.

18. The method of claim 14, wherein:
  the management request is stored on a memory coupled to the MCU.

19. The method of claim 18, wherein:
  the memory is a flash memory.

20. The method of claim 14, wherein:
  the security parameter is associated with the wireless transmission by the MCU of the application data from the microprocessor.

* * * * *